US009168790B2

(12) United States Patent
Ruffenach et al.

(10) Patent No.: US 9,168,790 B2
(45) Date of Patent: Oct. 27, 2015

(54) TIRE FOR VEHICLE, COMPRISING A TREAD COMPRISING A PLURALITY OF COMPOUNDS AND A RADIAL CARCASS REINFORCEMENT FORMED OF AT LEAST TWO LAYERS

(75) Inventors: Jean-Marc Ruffenach, Cebazat (FR); Alain Valle, Cebazat (FR); Luc Bestgen, Chatel-Guyon (FR); Pascal Prost, Riom (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 355 days.

(21) Appl. No.: 13/042,111

(22) Filed: Mar. 7, 2011

(65) Prior Publication Data

US 2011/0214793 A1     Sep. 8, 2011

Related U.S. Application Data

(60) Provisional application No. 61/349,370, filed on May 28, 2010.

(30) Foreign Application Priority Data

Mar. 5, 2010   (FR) ...................................... 10 51608

(51) Int. Cl.
*B60C 9/08*      (2006.01)
*B60C 11/00*    (2006.01)
*B60C 9/20*      (2006.01)

(52) U.S. Cl.
CPC ........... *B60C 11/0058* (2013.04); *B60C 9/2009* (2013.04); *B60C 2009/0441* (2013.04); *B60C 2009/2012* (2013.04); *B60C 2200/10* (2013.04); *Y10T 152/10855* (2015.01)

(58) Field of Classification Search
CPC .............. B60C 9/02; B60C 9/04; B60C 9/08; B60C 9/2009; B60C 2009/0253; B60C 2009/0441; B60C 11/0008; B60C 11/005; B60C 11/0058; B60C 2011/0016; B60C 2200/10; Y10T 152/10855
USPC ................. 152/548, 552, 556, 557, 558, 560, 152/209.5
IPC .......................................................... B60C 9/08
See application file for complete search history.

(56) References Cited

U.S. PATENT DOCUMENTS 4,385,653 A *   5/1983   Okazaki et al. ............ 152/209.5
4,683,928 A *   8/1987   Yahagi ....................... 152/209.5

(Continued)

FOREIGN PATENT DOCUMENTS

EP     1 004 460     11/1999
EP     2 106 931     1/2008

(Continued)

OTHER PUBLICATIONS

English Language Machine Translation of JP08-108704, 1996.*

*Primary Examiner* — Richard Crispino
*Assistant Examiner* — Philip N Schwartz
(74) *Attorney, Agent, or Firm* — Cozen O'Connor

(57) ABSTRACT

A motorized two-wheeled vehicle, comprising a radial carcass reinforcement formed of at least two layers of reinforcing elements, and comprising underneath the tread a crown reinforcement structure comprising of at least one layer of reinforcing elements. At least the tread surface comprises a first polymeric compound extending in at least the region of the equatorial plane and at least one second polymeric compound having physicochemical properties different from those of said first polymeric compound, the density of reinforcing elements in the radially inner carcass reinforcement layer being less than that in the radially outer carcass reinforcement layer.

9 Claims, 3 Drawing Sheets

(56) References Cited

U.S. PATENT DOCUMENTS

| | | |
|---|---|---|
| 6,286,575 B1 | 9/2001 | Nakamura |
| 6,598,646 B1 * | 7/2003 | Minami et al. ................ 152/550 |
| 2009/0229718 A1 * | 9/2009 | Valle et al. ................ 152/185.1 |
| 2010/0101694 A1 | 4/2010 | Ubukata et al. |

FOREIGN PATENT DOCUMENTS

| | | | | |
|---|---|---|---|---|
| FR | 2886215 | * | 12/2006 | ............. B60C 11/00 |
| JP | 08108704 A | * | 4/1996 | ............... B60C 9/04 |

\* cited by examiner

TIRE FOR VEHICLE, COMPRISING A TREAD COMPRISING A PLURALITY OF COMPOUNDS AND A RADIAL CARCASS REINFORCEMENT FORMED OF AT LEAST TWO LAYERS

RELATED APPLICATIONS

This application claims priority from French patent application Ser. No. 10/51608 filed Mar. 5, 2010 and U.S. Provisional Patent Application Ser. No. 61/349,370 which was filed on May 28, 2010, the entire content of both of which are hereby incorporated by reference.

FIELD OF THE INVENTION

The invention relates to a tire intended to be fitted to a vehicle and more particularly intended to be fitted to a two-wheeled vehicle such as a motorcycle.

Although not limited to such an application, the invention will be described more particularly with reference to a tire for a motorcycle, or motorbike.

BACKGROUND OF THE INVENTION

As in the case of all other tires, there is a trend towards the use of radial motorcycle tires, the architecture of such tires comprising a carcass reinforcement formed of one or two layers of reinforcing elements making an angle with the circumferential direction which can be between 65° and 90°. Said carcass reinforcement is surmounted radially by a crown reinforcement formed of reinforcing elements. The invention also relates to partially radial tires—that is, tires in which the reinforcing elements of the carcass reinforcement are radial in at least part of said carcass reinforcement, for example in the part corresponding to the crown of the tire.

Many architectures have been proposed for the crown reinforcement, depending on whether the tire is to be mounted at the front of the motorbike or at the rear. A first structure for said crown reinforcement involves using only circumferential cables, and said structure is more particularly used for the rear position. A second structure, directly inspired by the structures often used on tires for passenger vehicles, has been used to improve wear resistance, and involves using at least two working crown layers of reinforcing elements which are approximately parallel to each other within each layer but intersect from one layer to the next, forming acute angles with the circumferential direction, such tires being especially suitable for the front of a motorbike. Said two working crown layers may be accompanied by at least one layer of circumferential elements, usually obtained by helically winding a band of at least one rubber-coated reinforcing element.

Which architecture is selected for the tire crown directly affects certain properties of the tire such as wear, endurance, grip, or ride comfort or, in the case of motorcycles in particular, stability. However, other tire parameters such as the type of rubber compounds forming the tread, also affect the properties of said tire. The selection and type of rubber compounds forming the tread are, for example, essential wear property-related parameters. The selection and type of rubber compounds forming the tread also affect the tire's grip properties.

SUMMARY OF THE INVENTION

It is an object of the invention to provide a tire for a motorized two-wheeled vehicle in which the wear and grip properties of the tread of said tire are improved, while ride comfort is either not reduced or even improved.

This object has been achieved according to one aspect of the invention directed to a tire for motorized two-wheeled vehicle, comprising a radial carcass reinforcement formed of at least two layers of reinforcing elements, at least one of which is anchored by being turned up around a bead core on each side of the tire inside a bead, each bead being continued radially outwardly by a sidewall, the sidewalls being joined radially outwardly to a tread, and comprising underneath the tread a crown reinforcement structure comprising at least one layer of reinforcing elements, at least the tread surface comprising a first polymeric compound extending in at least the region of the equatorial plane and at least one second polymeric compound having physicochemical properties different from those of said first polymeric compound, and the density of reinforcing elements in the radially inner carcass reinforcement layer being less than that in the radially outer carcass reinforcement layer.

The longitudinal direction of the tire, or circumferential direction, is the direction corresponding to the periphery of the tire and is defined by the direction in which the tire rolls.

The transverse or axial direction of the tire is parallel to the axis of rotation of the tire.

The axis of rotation of the tire is the axis about which it rotates in normal use.

A circumferential plane or circumferential cutting plane is a plane perpendicular to the axis of rotation of the tire. The equatorial plane is the circumferential plane passing through the centre or crown of the tread and therefore in the central part of the tread.

A radial or meridian plane contains the axis of rotation of the tire.

The radial direction is a direction that intersects the axis of rotation of the tire and is perpendicular to this axis. The radial direction is the intersection between a circumferential plane and a radial plane.

The axial width of a region formed by the second polymeric compound is measured in a meridian profile in the axial direction between the edges of said region, when the tire is mounted on its service rim and inflated to its recommended pressure.

For the purpose of an embodiment of the invention, the reinforcing elements of a layer of a radial carcass reinforcement form, in the equatorial plane, an angle with the circumferential direction of between 65° and 90°.

The tread of the tire according to an embodiment of the invention therefore comprises, at least at the surface, a central circumferential part or strip comprising of a first polymeric compound, and at least two lateral parts or strips of another polymeric compound. The lateral strips are advantageously identical in order to produce a symmetrical tire, that may in certain embodiments be composed of different compounds. The central circumferential part or strip extends axially, in accordance with the invention, over a region containing the equatorial plane.

In an advantageous embodiment of the invention, in order to give the tire symmetrical properties, the central circumferential strip is advantageously centred on the equatorial plane. In other embodiments, intended for example for tires designed for use on a circuit in which most of the bends are in the same direction, the central circumferential strip may not be centered on the equatorial plane.

Advantageous variants of the invention may involve the presence of five or more circumferential strips to form at least the tread surface and thus give a gradual progression of the properties of said tread from the equatorial plane towards the shoulders. As before, such an embodiment may or may not be symmetrical about the equatorial plane, the distribution of the strips differing either in composition or in distribution about the equatorial plane.

In a preferred embodiment of the invention, the second polymeric compound is of a different composition from that of the first polymeric compound and also preferably the second polymeric compound has grip properties superior to those of said first polymeric compound.

In other embodiments, different properties may be obtained with identical compounds by means of differing curing conditions.

According to an embodiment of the invention, the second polymeric compound has a Shore A hardness different to that of the first polymeric compound.

The Shore A hardness of the polymeric compounds after curing is measured according to standard ASTM D 2240-86.

Other properties of the second polymeric compound may be different. As an example, the color may be different in order to give a functional and/or styling effect.

In addition, according to an embodiment of the invention, the density of reinforcing elements in the radially inner carcass reinforcement layer is less than that of the radially outer carcass reinforcement layer.

A tire constructed in this way according to an embodiment of the invention has better performance in terms particularly of wear and grip, owing in particular to the choices made as regards the polymeric compounds forming the tread. In addition, the variation in the density of reinforcing elements between the carcass reinforcement layers—whereby the radially outer layer has a higher density, will improve ride comfort. The inventors believe they have shown that the presence of a high density of reinforcing elements at the base of the most flexible polymeric compounds of the tire tread avoids excessive deformations of the polymeric compound between said reinforcing elements when large deformations occur in said polymeric compounds of the tread. Thus, if the most flexible polymeric compounds form the axially outer parts of the tread, the variation of the density of reinforcing elements proposed in accordance with the invention results in improved ride comfort when driving with camber.

Furthermore, the presence of at least one layer of the carcass reinforcement having fewer reinforcing elements and therefore a lower density of said reinforcing elements appears to improve the performance of the tire in terms of absorbing bumps in the surface on which the vehicle is traveling. The presence of fewer reinforcing elements in at least one of the carcass reinforcement layers will thus result in improved ride comfort, especially when traveling in a straight line.

Preferably, according to the invention, the ratio of the density of reinforcing elements in the radially inner carcass reinforcement layer to the density of reinforcing elements in the radially outer carcass reinforcement layer is between 2/3 and 8/9. A difference of less than 1/9 between the densities of each of the carcass reinforcement layers would be too small to improve the ride comfort to a degree that would be perceptible to the rider. A difference of more than 1/3 between the densities of each of the carcass reinforcement layers, particularly with a reduced density in the radially inner carcass reinforcement layer, results in a decrease in drift stiffness and therefore a deterioration in the general behavior.

Advantageously, $R_1$ being the inside radius of a bead core and $R_2$ the radius of the radially outer carcass reinforcement layer in the equatorial plane, the density of reinforcing elements in the radially inner carcass reinforcement layer is between $70 \times R_1/R_2$ and $110 \times R_1/R_2$ reinforcing elements per decimeter.

$R_1$ is the inside radius of the bead core—that is, the radius of the largest circle inscribed inside a bead core.

$R_2$ is the radius of the radially outer carcass reinforcement layer in the equatorial plane—that is, the radius of the largest circle inscribed inside the radially outer carcass reinforcement layer, in the equatorial plane.

The radius $R_2$ is measured on the tire, the tire being mounted on its service rim and inflated to its recommended pressure.

Regarding the radially inner carcass reinforcement layer, density values of less than $70 \times R_1/R_2$ reinforcing elements per decimeter can lead to problems with tire operation, and density values of greater than $110 \times R_1/R_2$ reinforcing elements per decimeter show their limit with regard to improving ride comfort when driving in a straight line.

Advantageously again, $R_1$ being the inside radius of a bead core and $R_2$ the radius of the radially outer carcass reinforcement layer in the equatorial plane, the density of reinforcing elements in the radially outer carcass reinforcement layer is between $100 \times R_1/R_2$ and $130 \times R_1/R_2$ reinforcing elements per decimeter.

Regarding the radially outer carcass reinforcement layer, density values less than $100 \times R_1/R_2$ reinforcing elements per decimeter show their limit with regard to improving ride comfort for example with camber, and density values greater than $130 \times R_1/R_2$ reinforcing elements per decimeter can lead to problems with tire operation.

In a first embodiment of the invention, the tire being intended to be fitted to the rear wheel of the vehicle, the region of the tread surface formed by the first polymeric compound has an axial width of between 15 and 30% of the axial width of the tread.

As explained earlier, the axial width of the tread is measured on a meridian profile in the axial direction between the edges of the tread, when the tire is mounted on its service rim and inflated to its recommended pressure.

A tire intended to be fitted to the rear wheel of a motorcycle is more particularly sensitive to wear when traveling in a straight line; the tire thus proposed by the invention in this first embodiment, with a more wear-resistant polymeric compound, greatly improves the performance in terms of wear. The polymeric compound of the lateral parts of the tread, meanwhile, is advantageously effective in terms of grip properties.

In a second embodiment of the invention, the tire being intended to be fitted to the front wheel of the vehicle, the region of the tread surface formed by the first polymeric compound has an axial width of between 45 and 70% of the axial width of the tread.

A tire intended to be fitted to the front wheel of a motorcycle is less sensitive to centre wear than one intended to be fitted to the rear wheel. The tire thus proposed in this second embodiment comprises advantageously a tread comprising polymeric compounds whose wear-related properties are less than those of the compounds of the tire intended to be fitted to the rear wheel. The central part of the tread is thus relatively wide and the lateral parts advantageously comprise a polymeric compound with high grip properties.

As an example, the polymeric compound of the central part of the tire intended to be fitted to the front wheel has properties approximately equivalent to those of the polymeric compound forming the lateral parts of the tire intended to be fitted to the rear wheel.

An advantageous variant of the invention provides that the crown reinforcement structure comprises at least one layer of circumferential reinforcing elements.

Preferably again, the reinforcing elements of the layer of circumferential reinforcing elements have an elastic modulus greater than 6000 N/mm$^2$.

Also preferably, the reinforcing elements of the layer of circumferential reinforcing elements are metallic and/or textile and/or glass.

In a variant of the invention, the crown reinforcement structure comprises at least two layers of reinforcing elements and from one layer to the next the sections form angles with each other of between 20° and 160°.

In a preferred embodiment of the invention, the reinforcing elements of the working layers are made of textile material.

In another embodiment of the invention, the reinforcing elements of the working layers are made of metal.

DETAILED DESCRIPTION OF THE DRAWINGS

Figure 1:
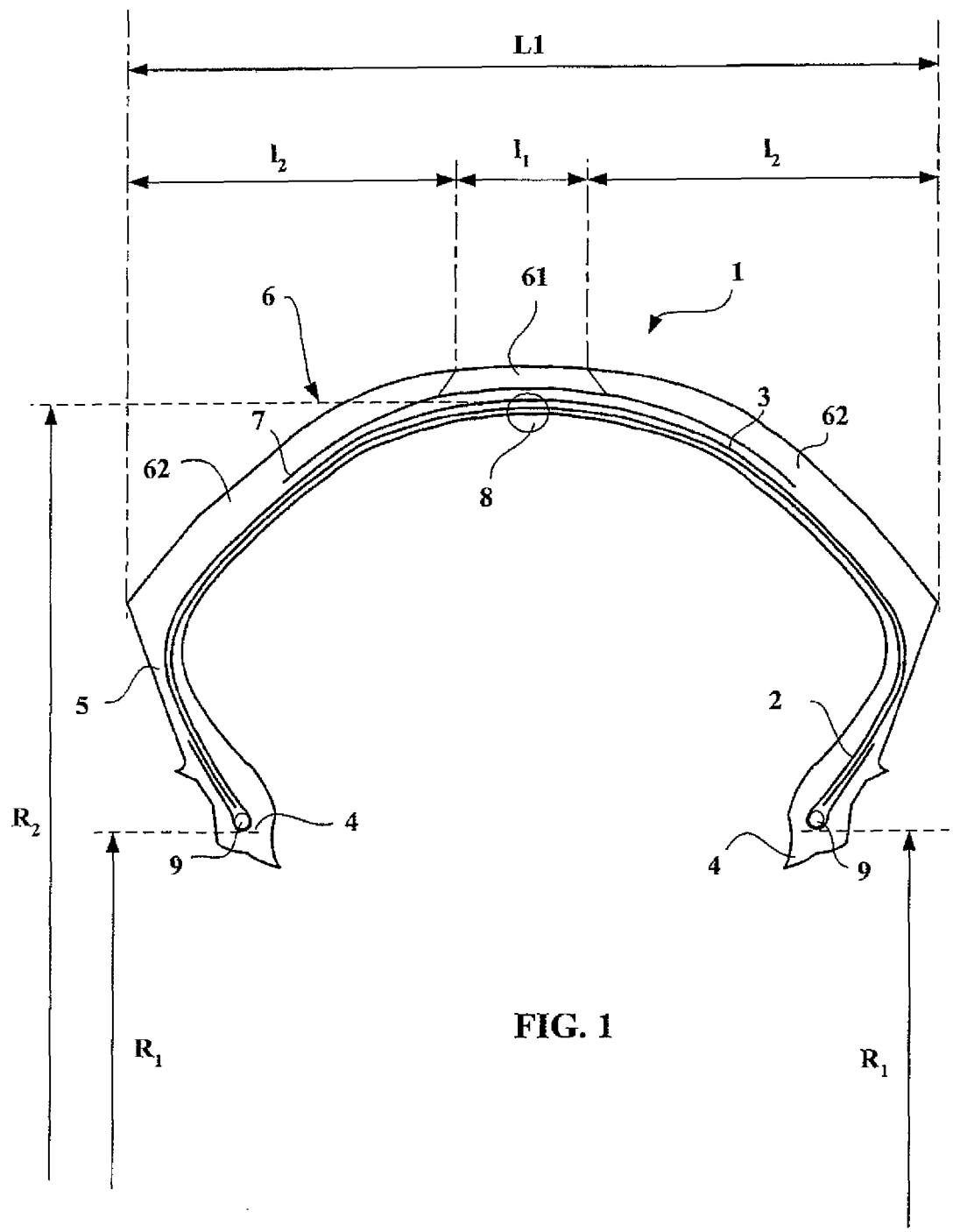
FIG. 1, a meridian view of a diagram of a tire in a first embodiment of the invention, FIG. 2, an enlarged partial view of part of the FIG. 1 diagram, FIG. 3, a meridian view of a diagram of a tire in a second embodiment of the invention.
Figure 2:
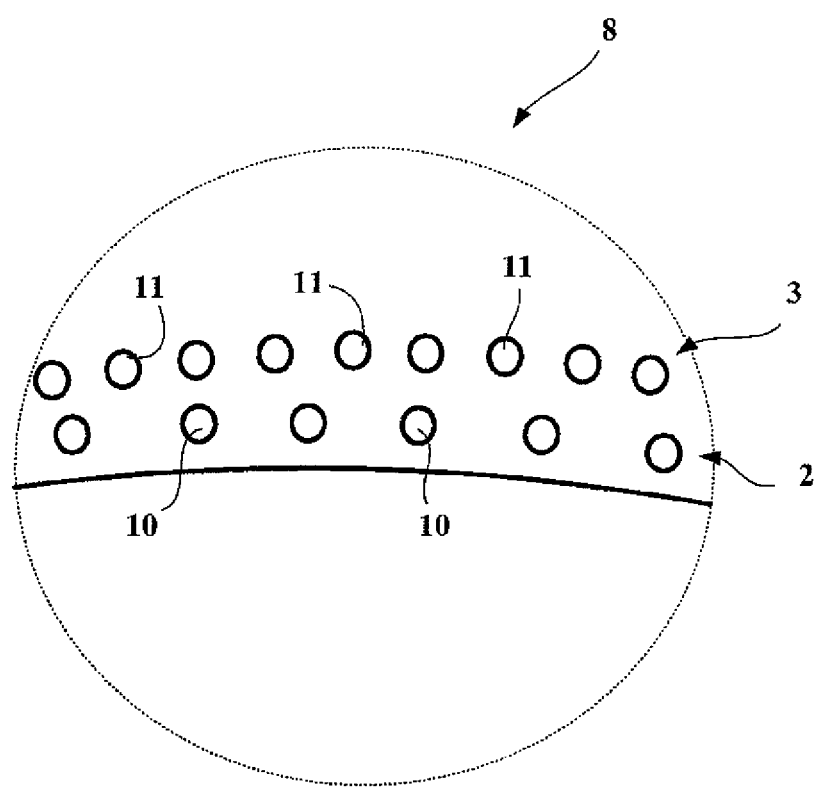
Figure 3:
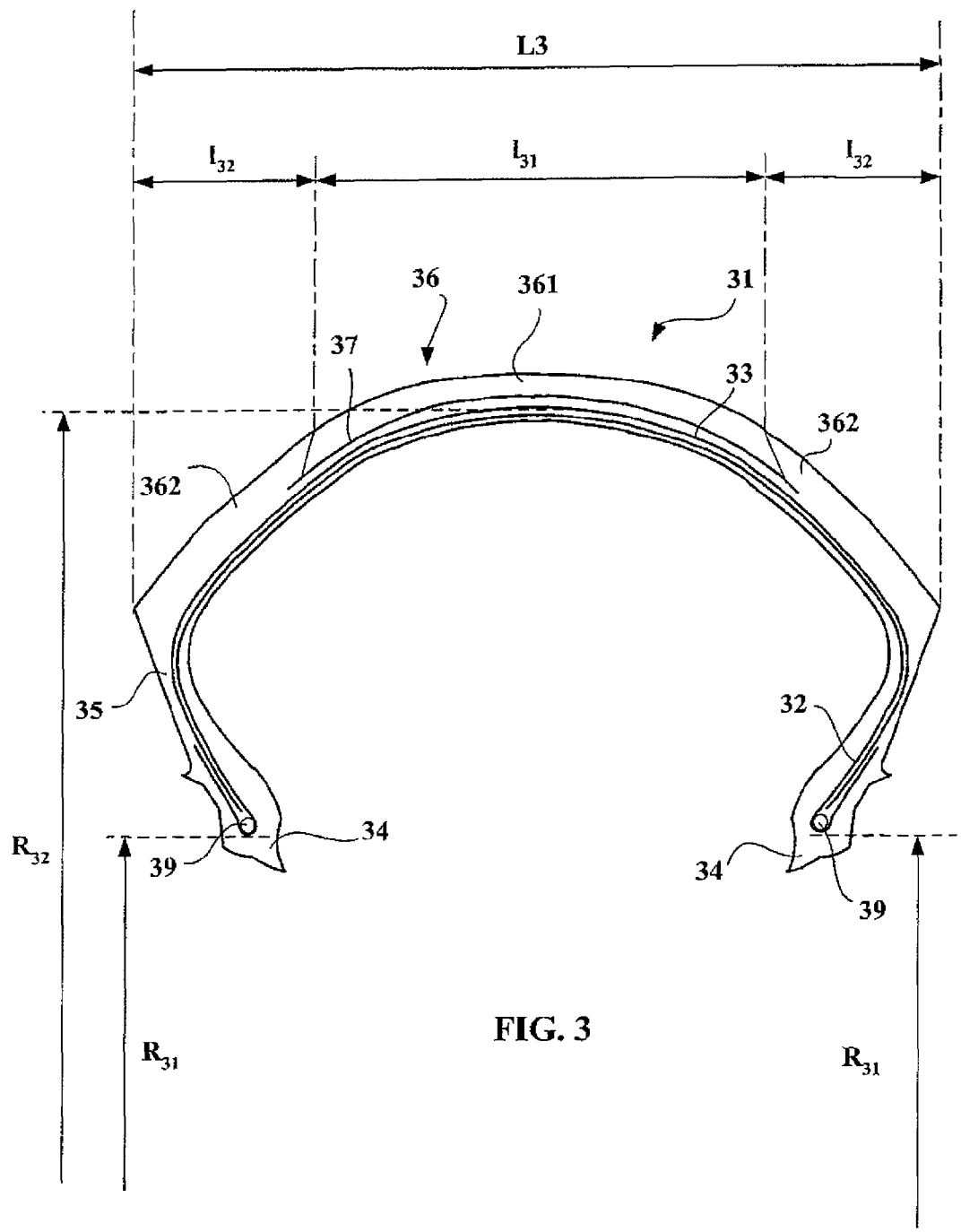

FIGS. 1 to 3 are not shown to scale, for ease of understanding.

FIG. 1 shows a type 190/50 ZR 17 tire 1 intended to be fitted to the rear wheel of a motorcycle and comprising a carcass reinforcement comprising two layers 2, 3 comprising reinforcing elements of textile type, more specifically aliphatic polyamide 140 tex/2. The layers 2, 3 of the carcass reinforcement comprise reinforcing elements forming an angle with the longitudinal direction of the tire in the equatorial plane equal to 80° and intersecting from one layer to the next.

The layers 2, 3 of the carcass reinforcement are anchored on each side of the tire 1 in a bead 4 whose base is intended to be fitted to a rim seat. Each bead 4 is continued radially outwardly by a sidewall 5, said sidewall 5 being joined radially outwardly to the tread 6.

The layer 2 has turn-ups around bead cores 9.

The radius $R_1$, that is, the inside radius of a bead core, is equal to 219 mm.

The radius $R_2$, the radius of the radially outer carcass reinforcement layer in the equatorial plane, is equal to 303 mm.

The tire 1 also has a crown reinforcement comprising a layer 7 of circumferential reinforcing elements made of textile material, more precisely aromatic polyamide 167 tex/2.

The layer of circumferential reinforcing elements 7 advantageously comprises a single thread wound to form an angle with the longitudinal direction approximately equal to 0°. The layer of circumferential reinforcing elements 7 may also be produced by the simultaneous winding of a plurality of bare threads or in the form of bands when embedded in rubber.

The tread 6 comprises, in accordance with the invention, a first rubber compound 61 in its central part and a second rubber compound 62 in the lateral parts. The transition zones between the parts 61 and 62 forming the tread 6 are advantageously formed progressively with a bevel interface, the angle of the bevel being between 20° and 60° relative to the outside tread surface 6 of the tire 1.

The rubber compound 62 is advantageously chosen such that its grip properties are superior to those of the rubber compound 61, said rubber compound 61 being more particularly chosen for its wear resistance. The resulting tread can define an advantageous wear resistance/grip compromise by comparison with what can be achieved with a single rubber compound.

The axial width $I_1$ of the central part corresponding to the rubber compound 61 is equal to 41 mm and represents approximately 22% of the axial width L1 of the tread, which is equal to 188 mm.

The axial widths $I_2$ of each of the lateral parts corresponding to the rubber compound 62 are identical and equal to 73.5 mm and represent approximately 39% of the axial width L1 of the tread.

FIG. 2 is an enlargement of the region 8 and indicates diagrammatically the density difference between each of the carcass reinforcement layers 2 and 3.

The carcass reinforcement layer 2 comprises reinforcing elements 10 and the carcass reinforcement layer 3 comprises reinforcing elements 11.

The density of reinforcing elements in the radially inner carcass reinforcement layer 2 is equal to $98 \times R_1/R_2$, that is 70.8 reinforcing elements per decimeter.

The density of reinforcing elements in the radially outer carcass reinforcement layer 3 is equal to $123 \times R_1/R_2$, that is 88.9 reinforcing elements 10 per decimeter.

FIG. 3 shows a 120/70 ZR 17 type tire 31 intended to be fitted to the front wheel of a motorcycle. This tire 31 is similar to that shown in FIG. 1, from which it differs in part by having angles of the reinforcing elements of the carcass reinforcement layers in the equatorial plane equal to 72°.

The tire 31 also differs from that shown in FIG. 1 in that the axial widths of the central and lateral regions correspond to the rubber compounds 361 and 362, respectively.

The axial width $I_{31}$ of the central part corresponding to the rubber compound 361 is equal to 73.6 mm and represents approximately 61% of the axial width L3 of the tread, which is equal to 120 mm.

The axial widths $I_{32}$ of each of the lateral parts corresponding to the rubber compound 362 are identical and equal to 23.2 mm and represent approximately 19% of the axial width L3 of the tread.

Further, the radius $R_{31}$—that is, the inside radius of a bead core—is equal to 219 mm and the radius $R_{32}$—that is, the radius of the tread in the equatorial plane—is equal to 290.5 mm.

The density of reinforcing elements in the radially inner carcass reinforcement layer 2 is equal to $98 \times R_{31}/R_{32}$, that is 73.9 reinforcing elements per decimeter.

The density of reinforcing elements in the radially outer carcass reinforcement layer 3 is equal to $123 \times R_{31}/R_{32}$, that is 92.7 reinforcing elements 10 per decimeter.

The invention should not be understood to be limited to the description of the examples given above and extends in particular to tires that may have more complex carcass or crown reinforcements comprising for example three or more, working layers of reinforcing elements forming an angle with the circumferential direction.

We claim:

1. A tire for a motorized two-wheeled vehicle, comprising a radial carcass reinforcement formed of at least two layers of reinforcing elements, at least one of which is anchored by being turned up around a bead core on each side of the tire inside a bead, and, each bead being continued radially outward by a sidewall, the sidewalls being joined radially outward to a tread, and comprising underneath the tread, a crown reinforcement structure comprising at least one layer of reinforcing elements, wherein at least a surface of the tread comprises a first polymeric compound extending in at least a region of an equatorial plane and at least one second polymeric compound having physicochemical properties different from those of said first polymeric compound, wherein a density of the reinforcing elements in a radially inner layer of the at least two carcass reinforcement layers is less than that in a radially outer layer of the at least two carcass reinforcement layers, wherein $R_1$ represents an inside radius of a bead core and $R_2$ represents a radius of the radially outer carcass reinforcement layer in the equatorial plane, wherein the density of the reinforcing elements in the radially inner carcass reinforcement layer is between $70 \times R_1/R_2$ and $110 \times R_1/R_2$ reinforcing elements per decimeter, and the density of the reinforcing elements in the radially outer carcass reinforcement layer is between $100 \times R_1/R_2$ and $130 \times R_1/R_2$ reinforcing elements per decimeter, and wherein a ratio $R_1/R_2$ is greater or equal to 0.7.

2. The tire according to claim 1, wherein the second polymeric compound is of a different composition from that of the first polymeric compound.

3. The tire according to claim 1, wherein the second polymeric compound has grip properties superior to those of the first polymeric compound.

4. The tire according to claim 1, wherein the second polymeric compound has a Shore A hardness less than that of the first polymeric compound.

5. The tire according to claim 1, wherein a ratio of the density of the reinforcing elements in the radially inner carcass reinforcement layer to the density of the reinforcing elements in the radially outer carcass reinforcement layer is between 2/3 and 8/9.

6. The tire according to claim 1, wherein the tire is intended to be fitted to the rear wheel of the vehicle, and wherein a region of the tread surface formed by the first polymeric compound has an axial width of between 15 and 30% of the axial width of the tread.

7. The tire according to claim 1, wherein the tire is intended to be fitted to the front wheel of the vehicle, and wherein a region of the tread surface formed by the first polymeric compound has an axial width of between 45 and 70% of the axial width of the tread.

8. The tire according to claim 1, wherein the crown reinforcement structure comprises at least one layer of circumferential reinforcing elements.

9. The tire according to claim 1, wherein the crown reinforcement structure comprises at least first and second layers of reinforcing elements, and wherein from the first layer to the second layer the reinforcement elements form angles with each other of between 20° and 160°.

* * * * *